United States Patent [19]
Tu

[11] Patent Number: 5,832,873
[45] Date of Patent: Nov. 10, 1998

[54] DEVICE FOR SEPARATING AND DEHYDRATING DROPPINGS

[76] Inventor: Chin-Hsun Tu, P.O. Box 63-247, Taichung, Taiwan

[21] Appl. No.: 2,624

[22] Filed: Jan. 5, 1998

[51] Int. Cl.$^6$ ..................................................... A01K 1/01
[52] U.S. Cl. ........................... 119/479; 119/442; 119/447; 119/450
[58] Field of Search .................................... 119/479, 442, 119/447, 451, 450

[56] References Cited

U.S. PATENT DOCUMENTS

| | | | |
|---|---|---|---|
| 556,637 | 3/1896 | Monroe | 119/451 X |
| 1,334,458 | 3/1920 | Johnson | 119/451 X |
| 1,560,680 | 11/1925 | Fernandes | 119/451 X |
| 3,119,373 | 1/1964 | Schmid | 119/451 |
| 3,685,493 | 8/1972 | Weiland, Jr. | 119/451 |
| 3,721,214 | 3/1973 | Staples et al. | 119/442 |
| 4,708,294 | 11/1987 | Endom | 119/442 X |
| 4,787,338 | 11/1988 | Stanley, Sr. et al. | 119/451 |
| 5,662,068 | 9/1997 | Childs | 119/451 |

*Primary Examiner*—Michael J. Cardone
*Assistant Examiner*—Yvonne Abbott
*Attorney, Agent, or Firm*—Charles E. Baxley, Esq.

[57] ABSTRACT

A device for separating and dehydrating droppings includes a body having two walls and a bottom which includes a meshed portion and a plain portion connected to one of two ends of the meshed portion. A first shaft and a second shaft are respectively and transversely disposed between the two walls, wherein the first shaft is driven by a first motor. A loop-shaped member is reeved through the first and the second shaft and has a plurality of plates transversely disposed thereto which are moved on an upper surface of the bottom. A hydrating device is disposed to the first end of the body and includes tube with an inlet and an outlet. The tube has a screw member rotatably disposed therein driven by a motor on a first end thereof and has a cap pivotally disposed to a second end thereof. The tube further has a slotted portion defined in an under periphery thereof.

6 Claims, 7 Drawing Sheets

DEVICE FOR SEPARATING AND DEHYDRATING DROPPINGS

BACKGROUND OF THE INVENTION

1. Field of the Invention

The present invention relates to a device to separating and dehydrating droppings of animals and, more particularly, to a device transferring droppings from liquid manure gutters to separating and dehydrating the solid portions which are to be used as fertilizers.

2. Brief Description of the Prior Art

Raising of stocks will certainly face to a problem about how to deal the droppings. The droppings involve liquid portion and solid portion. The droppings will contaminate rivers if the droppings are discarded directly into rivers directly. There has a device for separating the solid portion from the droppings and includes a slotted belt which is rotated about two shafts. Droppings will be sucked upwardly from the manure gutters and moved to the slotted belt which then carry the droppings to a higher position while liquid portion of the droppings will drop via the slots. The solid portion is then collected to a tank. However, such a device cannot dehydrate the droppings because there has no dehydrating means being used so that the collected solid portion needs to be dried up under sun or by other heating device both of the two ways will cause another type of air pollution. After all, there has no suitable devices designed to separate and hydrate the droppings for mediate or small farms.

The present invention intends to provide a device for separating and hydrating droppings which will mitigate and/or obviate the above-mentioned problems.

SUMMARY OF THE INVENTION

In one aspect of the present invention, there is provided a device for separating and dehydrating droppings, comprising a body having two walls and a bottom which includes a meshed portion and a plain portion connected to one of two ends of the meshed portion. The body has a first shaft and a second shaft respectively disposed between the two walls and located on a first end and a second end thereof. The first shaft is driven by a first motor so as to drive a loop-shaped member reeved through the first and the second shaft. The loop-shaped member has a plurality of plates transversely disposed thereto so that the plates are moved on an upper surface of the bottom.

A hydrating device is disposed to the first end of the body and comprises a tube with an inlet defined in a periphery thereof. A screw member driven by a second motor is rotatably received in the tube which has a cap pivotally disposed to an end thereof. The tube has a slotted portion defined in an under periphery thereof.

It is an object of the present invention to provide a device to separate and dehydrate droppings.

It is another object of the present invention to provide a device which effectively dehydrates the droppings.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
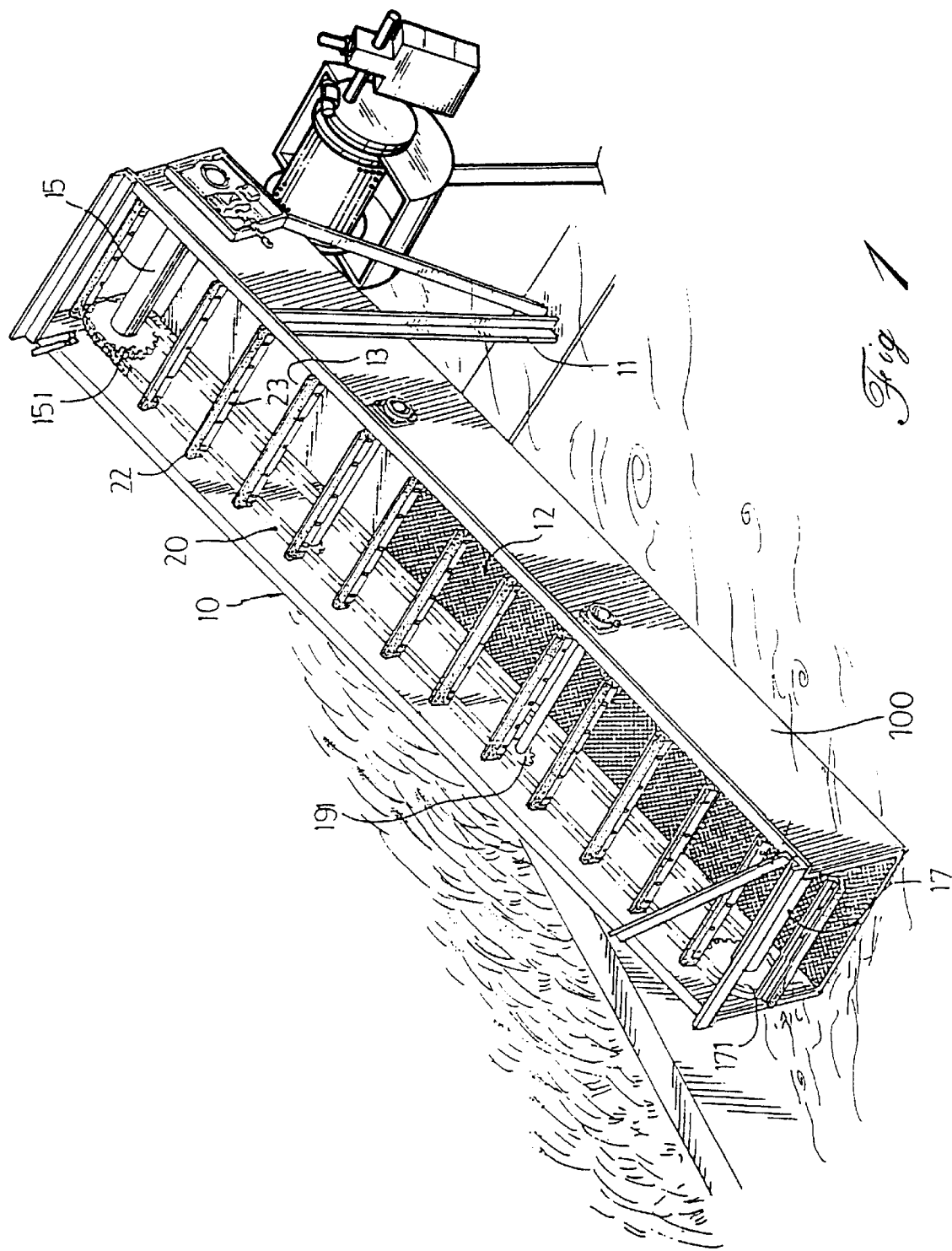
FIG. 1 is a perspective view of a device for separating and dehydrating droppings in accordance with the present invention.
Figure 2:
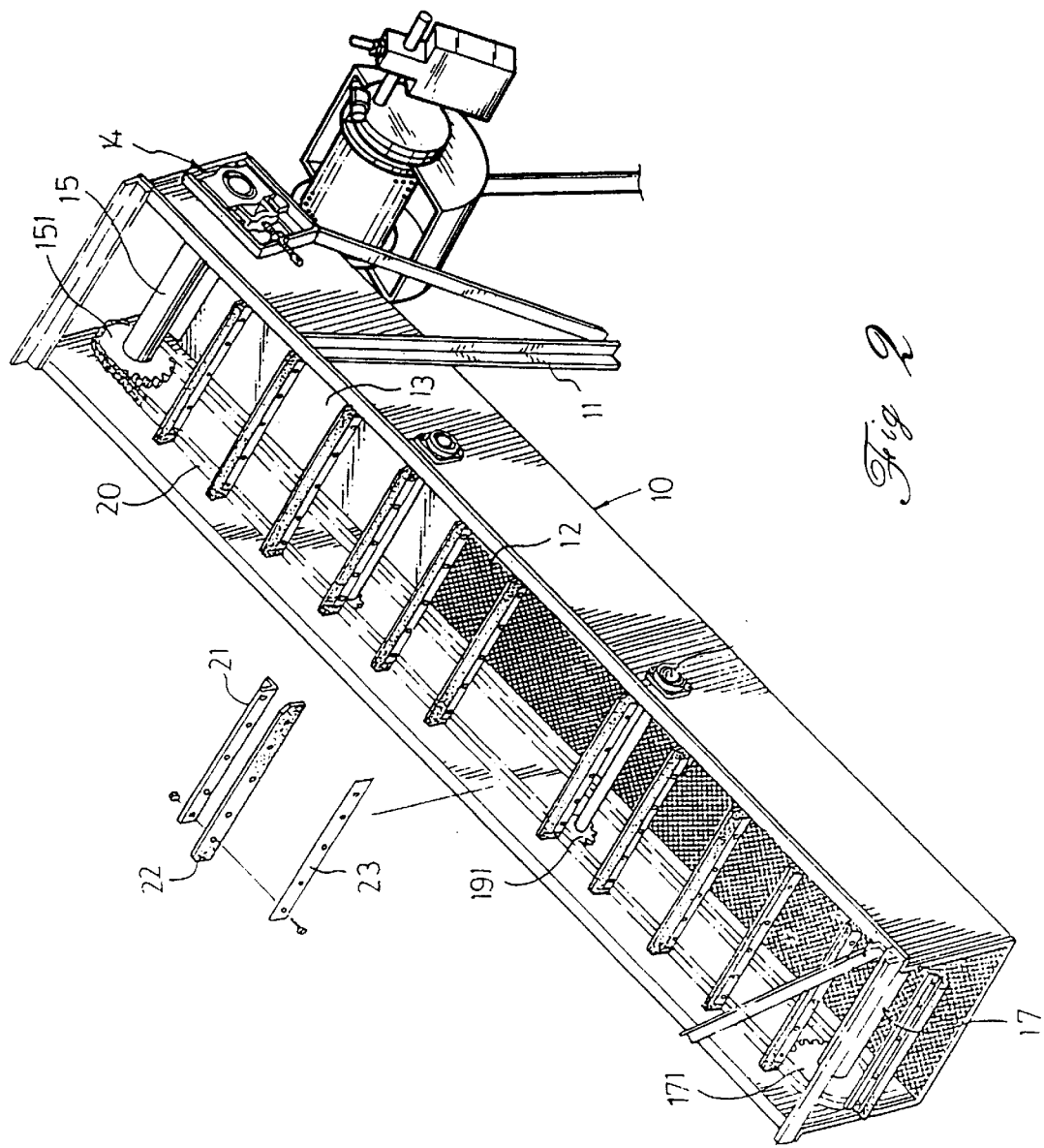
FIG. 2 is an exploded view of plates disposed to a loop-shaped member of the device in accordance with the present invention.
Figure 3:
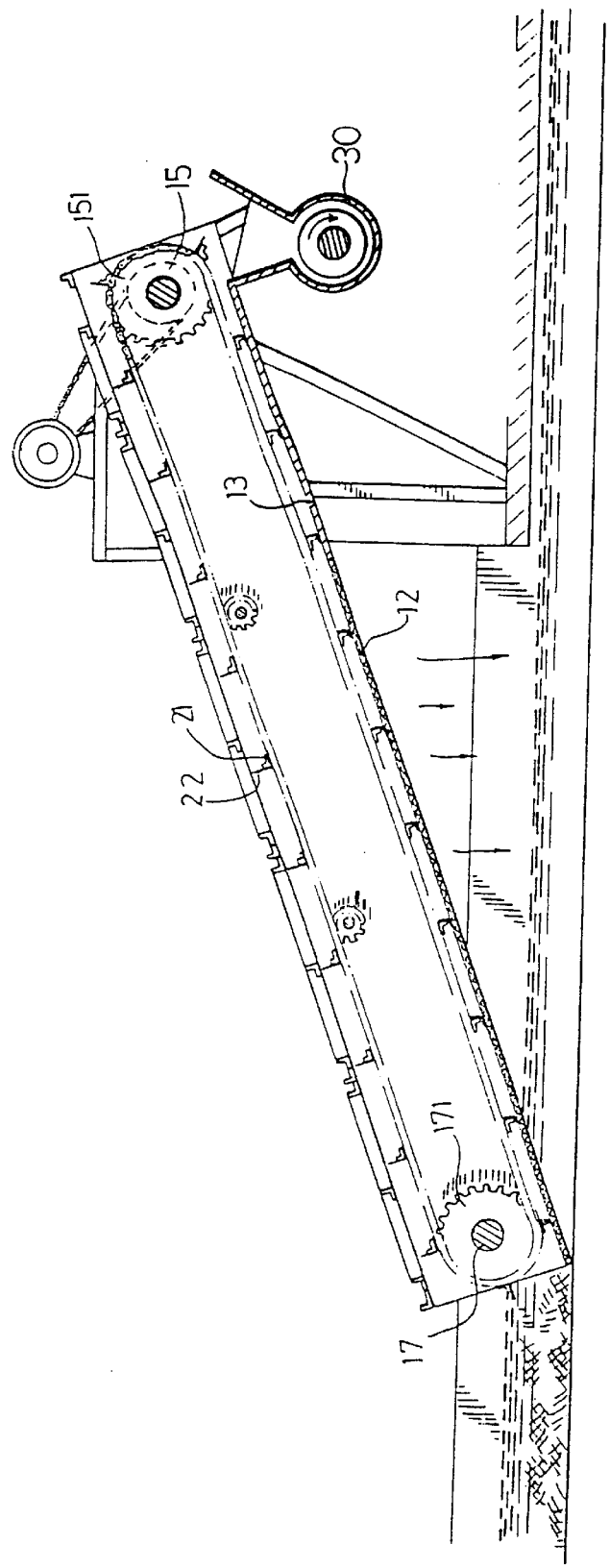
FIG. 3 is a side elevational view, partly in section, of the device disposed in a manure gutter.

Referring to the drawings and initially to FIGS. 1 through 3, a device for separating and dehydrating droppings in accordance with the present invention generally includes a body 10 having a bottom and two walls 100 extending from two opposite sides of the bottom which includes a meshed portion 12 and a plain portion 13 connected to one of two ends of the meshed portion 12. The body 10 has a first shaft 15 disposed between the two walls 100 of a first end thereof and a second shaft 17 disposed between the two walls 17 of a second end thereof which is disposed lower than that of the first end which is supported by a stand 11 in a manure gutter. The first shaft 15 is driven by a first motor 30 disposed beside the first end of the body 10. The first shaft 15 has two first gears 151 respectively and co-rotatably disposed to two ends thereof and the second shaft 17 has two second gears 171 respectively and co-rotatably disposed to two ends thereof. A loop-shaped member, two chains 20 in this embodiment, are respectively reeved through corresponding pair of the first gear 151 and the second gear 171. A plurality of plates 22 are transversely disposed between the two chains 20 so that the plates 22 are moved on an upper surface of the bottom. In order to support the two chains 20 at least one mediate gear 191 is disposed to each one of two walls 100. A plurality of L-shaped members 21 are fixedly disposed between the two chains 20 and each of the L-shaped members 21 has the plate 22 fixedly connected thereto which is fixed by a press plate 23.

Figure 4:
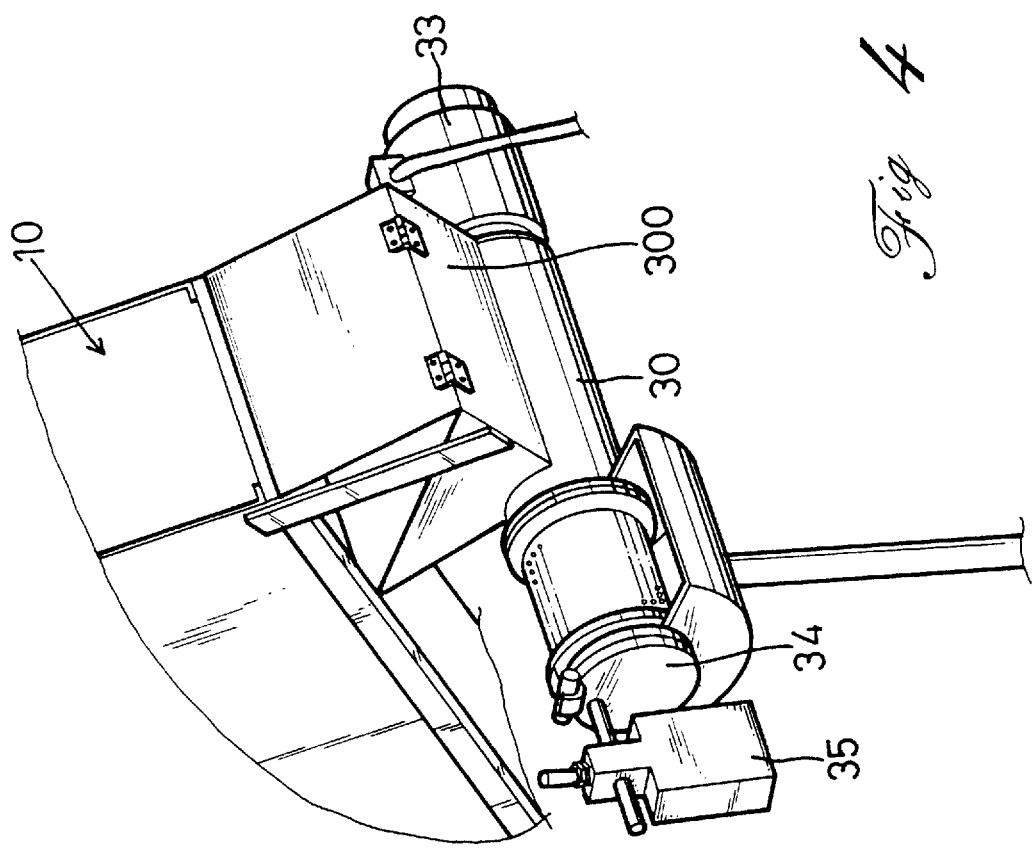
FIG. 4 is a perspective view of a dehydrating device in accordance with the present invention.
Figure 5:
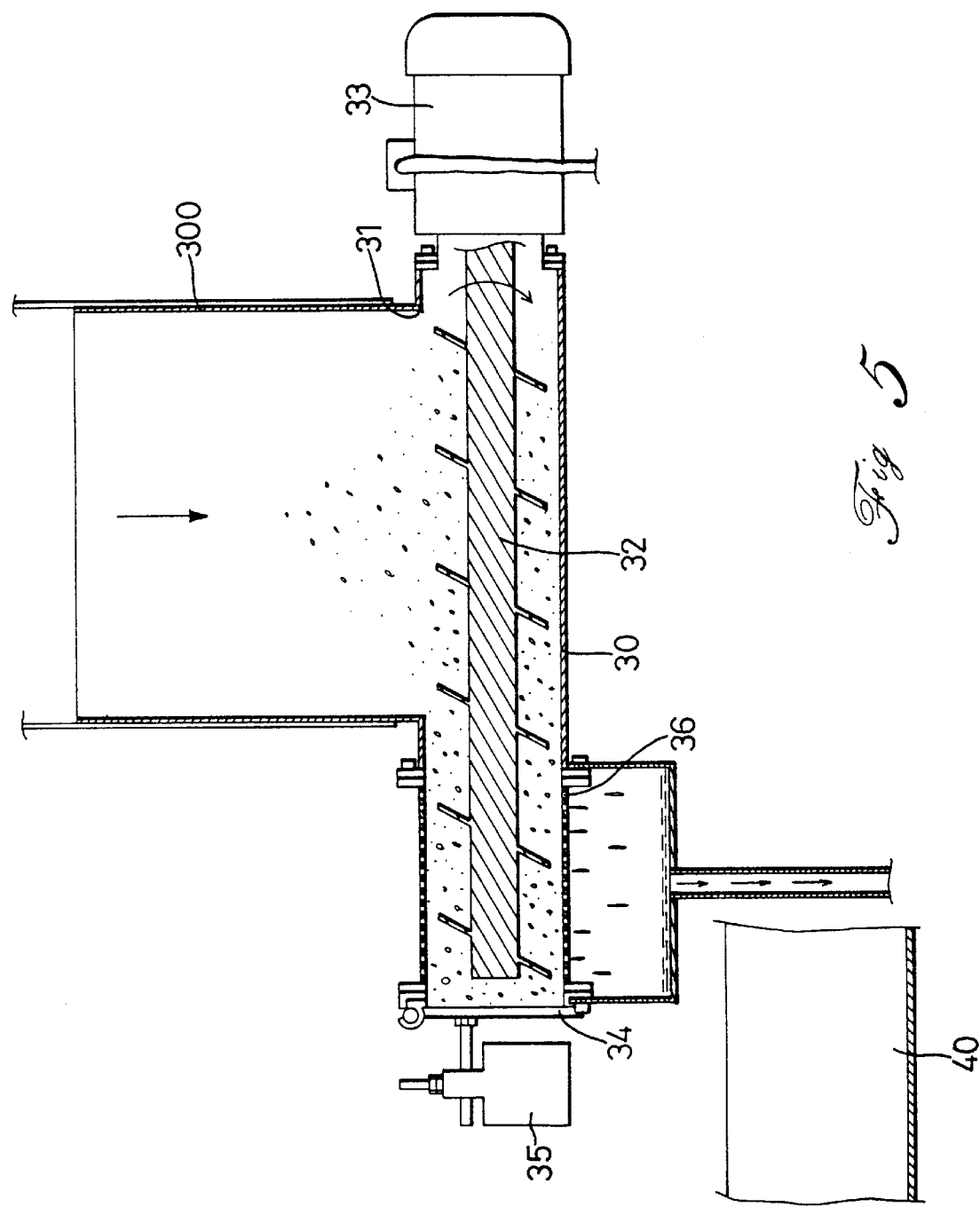
FIG. 5 is a side elevational view, partly in section, of the dehydrating device.
Figure 6:
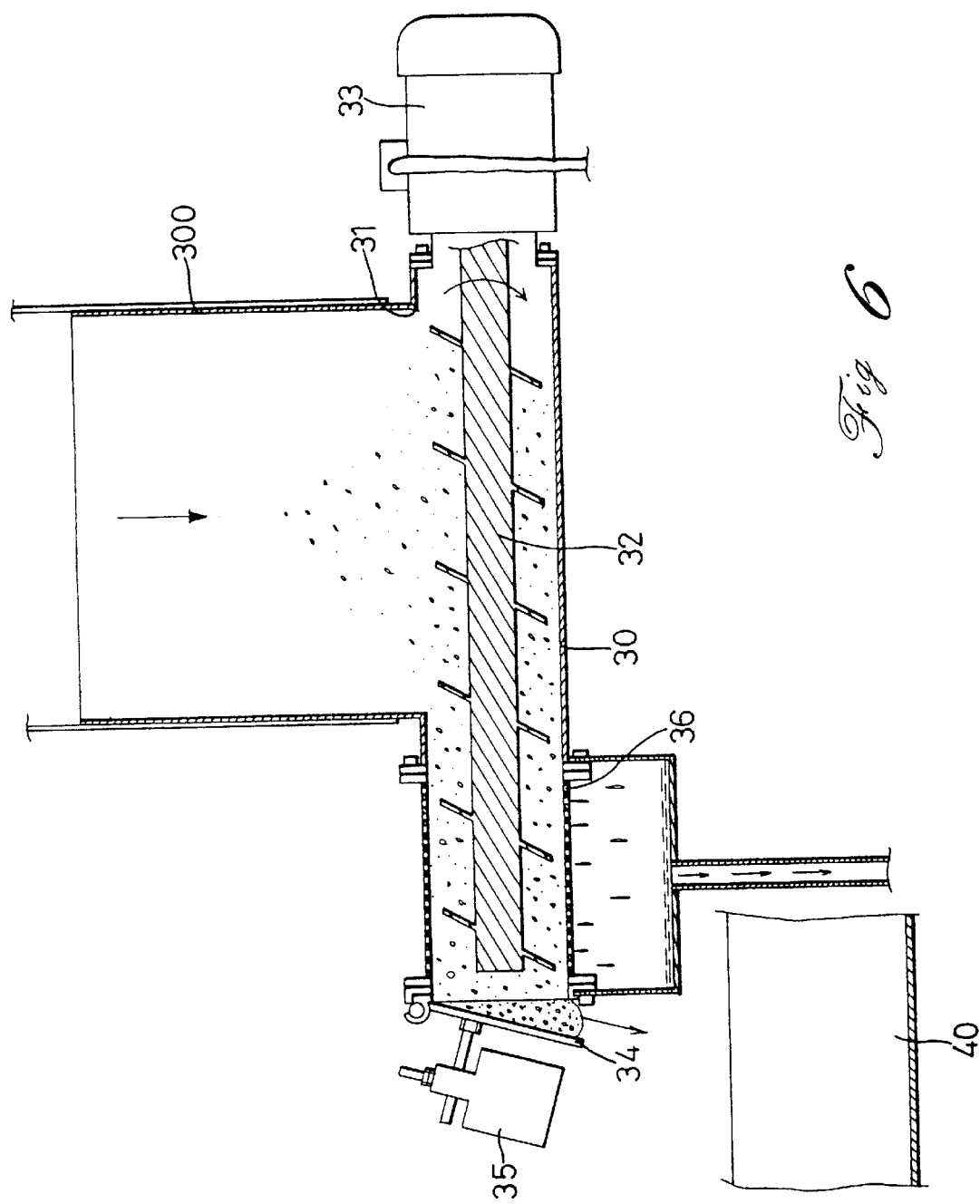
FIG. 6 is a side elevational view, partly in section, of the dehydrating device which extruding dehydrated droppings from an end of a tube.

Referring FIGS. 4 and 5, a hydrating device is disposed to the first end of the body 10 and comprises a tube 30 with an inlet 31 defined in a periphery thereof. A funnel 300 is connected between the first end of the body 10 and the inlet 31 of the tube 30 so as to let separated droppings drop into the tube 30 via the funnel 300. The tube 30 has a screw member 32 rotatably disposed therein which is driven by a second motor 33 disposed to a first end of the tube 30. The tube 30 further has a cap 34 pivotally disposed to a second end thereof and the cap 34 has a weight 35 disposed to an outside thereof. The tube 30 has a slotted portion 36 defined in an under periphery thereof.

The second end of the body 10 is merged into the manure gutter and when droppings are moved by the moving plates 23 toward the first end of the body 10, liquid in the droppings will drop during a travel of the meshed portion 12. In the meanwhile, the plates 23 will press the droppings to squeeze liquid in the droppings to drop via the meshed portion 12. The separated droppings are then moved on the plain portion 13 and then drop into the tube 30 via the funnel 300. The weight 35 sets a minimum force to open the cap 34 so that when the droppings are compressed against the cap 34, liquid will be further squeezed from the droppings and drops from the slotted portion 36. When the amount of the droppings reach to a certain level, the cap 34 is pushed to open and the dehydrated droppings drop into a collecting device.

Figure 7:
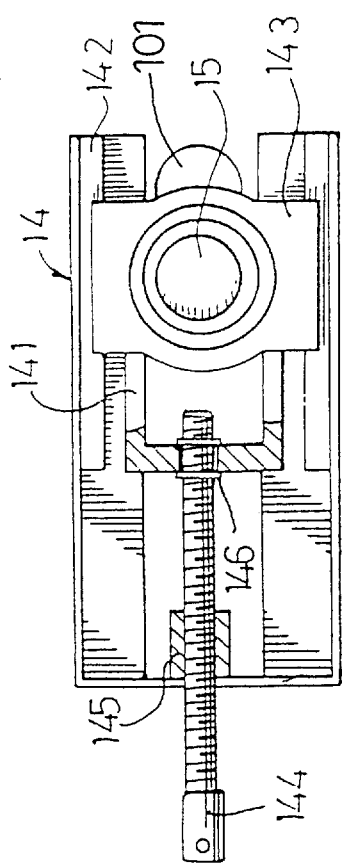
FIG. 7 is a side elevational view of a positioning means of the first shaft of the separating and dehydrating device of the present invention.
Figure 8:
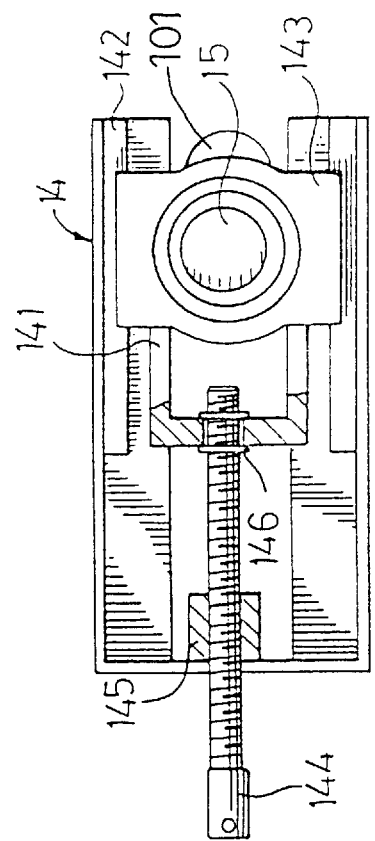
FIG. 8 is a side elevational view of a positioning means as shown in FIG. 7 when being operated.

Furthermore, referring to FIGS. 7 and 8, the two walls 100 each have a slot 101 defined therethrough and the first shaft 15 has two ends thereof extending through the two slots 101. Each of the two walls 100 has a frame 14 disposed to an outer side thereof and each of the frames 14 has two rails 142 formed to two opposite inner side thereof. A slide 143 is slidably disposed between the two rails 142 and fixedly connected one of two ends of the first shaft 15. Each of the slides 143 has a positioning means disposed thereto so as to adjustably position the slide 143 corresponding to the rails 142. The positioning means includes a transverse U-shaped connecting member 141 extending from the corresponding slide 143. A bolt 144 is threadedly extending through a tubular member 145 disposed to the frame 14 and immobilizingly and rotatably connected to the connecting member 141 by two clamps 146 so that when rotating the bolt 144, the connecting member 141 together with the slide 143 are moved such that the first shaft 15 is moved within the corresponding slot 101. The chains 20 can be maintained tightened by adjusting the first shaft 15.

Accordingly, the device of the present invention can effectively separate solid portions from the droppings and dehydrate the solid portions which can be used as fertilizers. The device occupies a limit space and has a simple structure so that it can be afforded by the people who need such a device.

Although the invention has been explained in relation to its preferred embodiment, it is to be understood that many other possible modifications and variations can be made without departing from the spirit and scope of the invention as hereinafter claimed.

What is claimed is:

1. A device for separating and dehydrating droppings, comprising:

a body having a bottom and two walls extending from two opposite sides of said bottom which includes a meshed portion and a plain portion connected to one of two ends of said meshed portion, said body having a first shaft disposed between said two walls of a first end thereof and a second shaft disposed between said two walls of a second end thereof, said first shaft driven by a first motor, a loop-shaped member reeved through said first and said second shafts, and having a plurality of plates transversely disposed thereto so that said plates are moved along on an upper surface of said bottom, and a hydrating device disposed to said first end of said body and comprising a tube with an inlet defined in a periphery thereof, said tube having a screw member rotatably disposed therein which is driven by a second motor disposed to a first end of said tube, said tube having a cap pivotally disposed to a second end thereof, said tube having a slotted portion defined in an under periphery thereof.

2. The device as claimed in claim 1 wherein said first shaft has two first gears respectively and co-rotatably disposed to two ends thereof and said second shaft has two second gears respectively and co-rotatably disposed to two ends thereof, said loop-shaped member being two chains and respectively reeved through corresponding pair of said first gear and said second gear.

3. The device as claimed in claim 1 wherein said cap has a weight disposed to an outside thereof.

4. The device as claimed in claim 1 wherein a funnel is connected between said first end of said body and said inlet of said tube.

5. The device as claimed in claim 1 wherein said two walls each have a slot defined therethrough and said first shaft has two ends thereof extending through said two slots, each of said two walls having a frame disposed to an outer side thereof and each of said frames having two rails formed to two opposite inner side thereof, a slide slidably disposed between said two rails and fixedly connected one of two ends of said first shaft, each of said slides having a positioning means disposed thereto so as to position said slide corresponding to said rails.

6. The device as claimed in claim 5 wherein said positioning means includes a connecting member extending from said corresponding slide and a bolt threadedly extending through said frame and immobilizingly and rotatably connected to said connecting member.

\* \* \* \* \*